No. 862,967. PATENTED AUG. 13, 1907.
J. HAWKYARD.
VALVE.
APPLICATION FILED AUG. 6, 1906.

2 SHEETS—SHEET 1.

Attest:
C. S. Maclean
Edward N. Sartou

Inventor
John Hawkyard
by Spear, Middleton, Donaldson & Spear
Attys

No. 862,967. PATENTED AUG. 13, 1907.
J. HAWKYARD.
VALVE.
APPLICATION FILED AUG. 6, 1906.
2 SHEETS—SHEET 2.
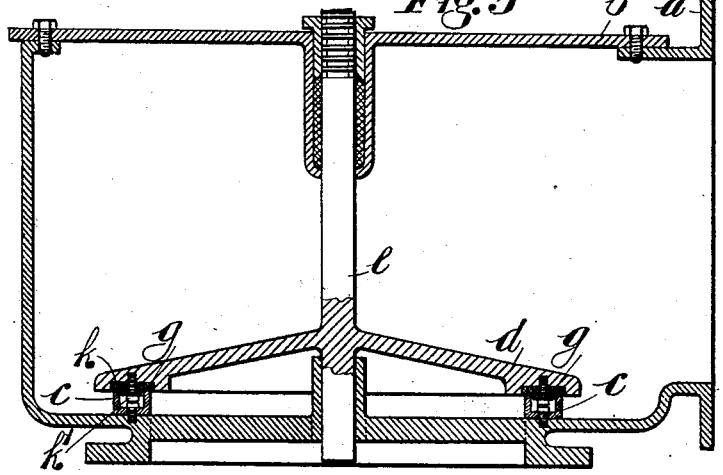
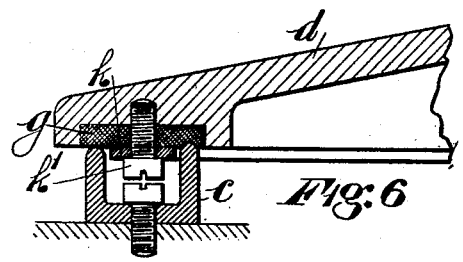
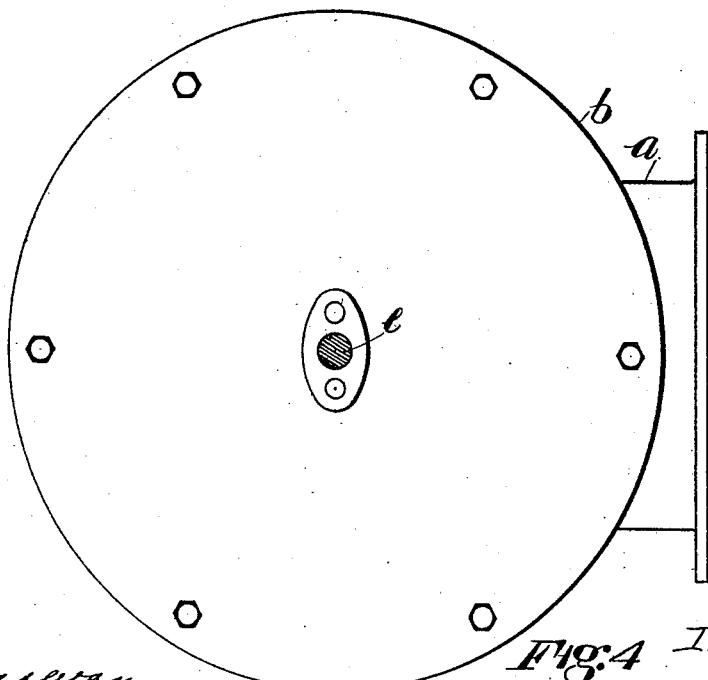
Inventor
John Hawkyard

UNITED STATES PATENT OFFICE.

JOHN HAWKYARD, OF SADDLEWORTH, ENGLAND.

VALVE.

No. 862,967.     Specification of Letters Patent.     Patented Aug. 13, 1907.

Application filed August 6, 1906. Serial No. 329,443.

*To all whom it may concern:*

Be it known that I, JOHN HAWKYARD, a subject of the King of Great Britain and Ireland, residing at The Hollies, Uppermill, Saddleworth, in the county of York, England, have invented certain new and useful Improvements in Valves, of which the following is a specification.

This invention relates to valves for controlling the flow of gas, or other fluid, through pipes, my object being to render such valves more effective in service and of greater durability than those now in general use as stop valves on gas or water mains, and for other purposes.

The invention comprises the combination with valves such as aforesaid, or with the seatings of such valves, of a cork bedding arranged as and for the purpose hereinafter described.

Figure 1:
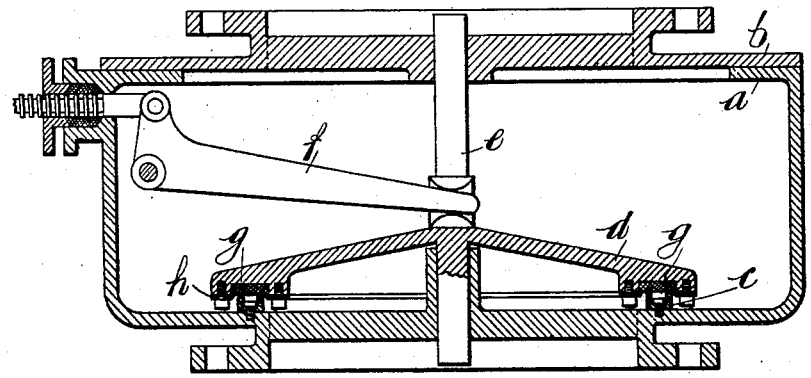
Figure 5:
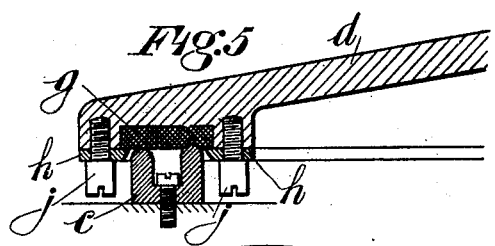
Figure 2:
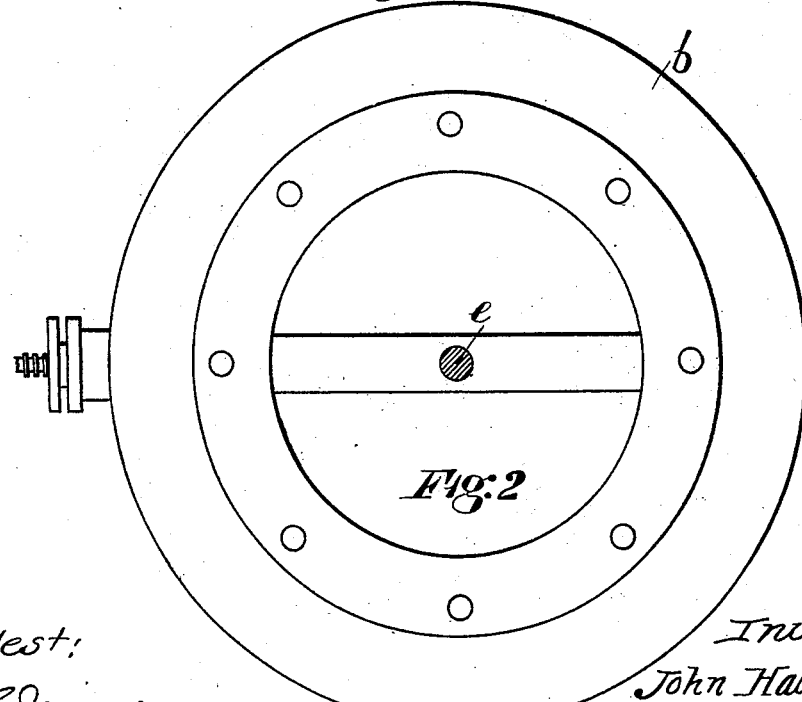

Referring to the accompanying explanatory drawings;—Figure 1 is a sectional elevation and Fig. 2 a plan of one form or type of gas valve having my invention applied thereto, while Figs. 3 and 4 are respectively similar views illustrating the application of the invention to another type of such valve. Figs. 5 and 6 are sectional elevations, drawn to a larger scale than the aforesaid figures, showing more clearly two convenient arrangements of the valves proper and their seatings.

The same reference letters in the different views indicate the same or similar parts.

In one convenient application of my invention in connection with the construction of a stop or regulating valve such as shown at Figs. 1 and 2, suitable for a gas main, or for an equivalent service, I make the valve casing or body from two flanged cylindrical castings as $a$ and $b$ which are bolted together in the ordinary manner. Within the said casing or body I provide a valve seat, the portion upon which the valve abuts being preferably formed from a circular disk as $c$ of lead or of a soft non-corrosive metal and made to project above the seat face as shown. The valve itself consists of a circular plate or annular disk $d$ provided with a suitable guide stalk or stem as $e$ and adapted to be raised above or to be lowered on to its seating, through the medium of a bell crank lever $f$ arranged within the casing and operated from the exterior, or in any other convenient manner.

The face of the valve or the flat surface adjacent to the seating, is grooved to receive a filling or bedding $g$ of cork which is secured therein in one manner by junk rings as $h$, or their equivalent. A sufficient annular space is left between the rings to enable them to fit over or clear the aforesaid projecting seat portion $c$ and so that the cork may take a direct bearing over the whole of the upper extremity of such seat portion.

The seat portion or ring $c$ is formed as illustrated with a groove between its outer and inner peripheries, and to more effectually insure a gas tight joint, I preferably arrange that the inner of the two annular valve seating surfaces which are thus provided, shall stand or project above the outer surface, as is represented at Fig. 5.

The heads of the screws such as $j$ by which the aforesaid junk rings $h$ are secured in position, may be prolonged, as illustrated at Fig. 5 so that they may serve as guard stops to limit the descent of the valve on to its seating or to prevent the seat rings $c$ from cutting too deeply into the cork bedding $g$.

Instead of junk rings such as $h$ for securing the cork in position I sometimes employ a ring as $k$ secured by screws $k'$ Fig. 6.

The valve shown at Figs. 3 and 4 is arranged for a right-angle flow of the gas therethrough instead of a straight flow as with the valve shown at Figs. 1 and 2.

Instead of providing the cork filling or bedding on the valve, I sometimes combine it with the valve seat and provide the valve with a lead or soft metal face for abutting or seating upon such bedding.

My invention is applicable to valves of varying types or forms as constructed to meet varying services or requirements.

Having described my invention, what I claim as new and desire to secure by Letters Patent is;—

1. In valves for gas or other fluid, the combination consisting of an annular disk, a cork bedding fitting in a groove in the flat face of said disk, a ring and screws for securing the said cork bedding in position in the said groove and guard stops formed integrally with the said screws serving to limit the fall or closing movement of the valve, substantially as described.

2. In valves for gas or other fluid, the combination consisting of an annular disk, a cork bedding fitting in a groove in the flat face of said disk, a ring and screws for securing said cork bedding in position in the said groove, a valve seat ring having a pair of annular seating surfaces, and guard stops formed integrally with the said screws serving to limit the fall or closing movement of the valve, substantially as described.

3. In valves for gas or other fluid, the combination consisting of an annular disk, a cork bedding fitting in a groove in the flat face of the said disk, a ring and screws for securing said cork bedding in position in the said groove, a valve seat ring having a pair of annular seating surfaces one of which projects above the other, and guard stops formed integrally with the said screws serving to limit the fall or closing movement of the valve, substantially as described.

4. In valves for gas or other fluid, the combination consisting of an annular disk, a cork bedding fitting in a groove in the flat face of said disk and annular means and screws for securing the said cork bedding in position in the said groove, and guard stops formed integrally with the said screws serving to limit the fall or closing movement of the valve, substantially as described.

In testimony whereof I affix my signature in presence of two witnesses.

JOHN HAWKYARD.

Witnesses:
   VIVIAN ARTHUR HUGHES,
   FRANK ABBERTON.